United States Patent [19]

Penn

[11] 3,718,737
[45] Feb. 27, 1973

[54] PROCESS OF TREATING BILE AND NOVEL IODINE-131 COMPLEX

[76] Inventor: Harry S. Penn, 2678 Glendower Street, Los Angeles, Calif. 90027

[22] Filed: Oct. 20, 1967

[21] Appl. No.: 676,732

[52] U.S. Cl. .................... 424/1, 424/106, 23/230 B, 252/301.1 R
[51] Int. Cl. .............................................. A61k 27/04
[58] Field of Search ...... 424/1, 106; 195/2; 23/230 B; 250/106 T; 252/301.1 R

[56] References Cited

UNITED STATES PATENTS 3,061,510   10/1962   Numerof et al. ......................... 424/1

OTHER PUBLICATIONS

Bayly, Nucleonics, Vol. 24, No. 6, June 1966, pages 46–53, [TK, 9001, N8].

*Primary Examiner*—Benjamin R. Padgett
*Attorney*—Herzig, Walsh & Blackham

[57] ABSTRACT

This invention, in one aspect, provides a novel process for obtaining a derivative from bovine bile as well as the novel product itself, the latter assaying about 95 percent taurocholic acid; and in a further aspect, provides a novel process for complexing radioactive iodine with the aforementioned bile derivative through the intermediary of a blood-derived protein which is first combined with $^{131}$I and then complexed with the derivative and, further, provides this product. The radioactive iodine-containing product is useful in diagnosing tumors since it selectively concentrates in the latter.

3 Claims, No Drawings

PROCESS OF TREATING BILE AND NOVEL IODINE-131 COMPLEX

This invention relates to a process for treating animal bile to obtain a water-soluble product containing bile acid-peptide conjugates and substantially free from bile pigments.

An object of the invention is to provide a process for treating bile to obtain the aforesaid novel bile product so that it functions as a tumor-selective carrier for 131-iodine.

Further objects of the invention will appear as the description thereof proceeds.

Fresh bile, such as bovine bile, contains mucin, pigments, lecithin, cholesterol, glycocol, choline compounds and bile-acid compounds in the form of salts of peptide conjugates, e.g., sodium glycocholate, sodium taurocholate, as well as minor quantities of other substances. It is known that the bile-acid conjugates can be split by subjecting them to vigorous hydrolysis with a strong alkali such as NaOH whereby the bile acids can be separately recovered from the remaining compounds. According to one aspect of the present invention, bile is subjected to mild hydrolysis in the presence of an added proteolytic enzyme, the aqueous hydrolysate is separated from pigments and other extraneous substances, and a water-soluble and approximately 95 per cent ethanol soluble fraction is recovered.

This invention, in another aspect thereof, also deals with a method of concentrating the radioactive isotope $^{131}I$ in cancer tissue in vivo. The procedure consists of first combining a bovine bile derivative, as hereinafter described (BBD), with human plasma, albumen or globulin which has been combined with radioactive iodine. Inasmuch as the complex then contains $^{131}I$, it is subject to detection by scintillometers, Geiger-Mueller counters, and the like, and may be termed "labeled" in accordance with standard terminology.

The objective includes:

As a diagnostic procedure: By employing tracer quantities (e.g.) (1-10 millicuries, MC.), a scintillation counter can localize not only the primary cancerous lesion, but also the presence of metastases in other areas.

A preferred form of the invention comprises acidifying fresh ox bile, or other animal bile, to a pH in the range of about 2.0 to 3.5 with a strong mineral acid, preferably HCl, filtering any insoluble matter from the acidified bile, adding a proteolytic enzyme to the filtered bile, subjecting the resulting mixture to proteolytic hydrolysis at a temperature in the range of from about 40°C. to about 50°C. for a time period of about one to five days, filtering the hydrolyzed bile, removing the bile pigments as by solvent extraction, separating the dissolved material from the aqueous phase as by salting out, and purifying the separated solids by redissolution, and the separation and purifying steps preferably take place around about 10° or less. It will be understood that a number of methods may be utilized for separating the bile pigments and purifying the water-soluble product.

Dialysis according to known procedures may also be employed; the non-dialyzable component is the useful fraction.

The proteolytic enzymes for the hydrolysis step may be selected from any of those commercially available. For example, pepsin, trypsin, chymotrypsin and papain, having at least a minimum activity as specified for commercial use, may be employed. While acidic conditions are preferred during hydrolysis, mildly alkaline conditions (pH 7 – 8) may be employed with proteolytic enzymes that are not inactivated by alkalies, such as trypsin and chymotrypsin.

Butanol is the preferred solvent for removal of the pigments. However, in place of butanol, other aliphatic alcohols having greater than two carbon atoms may be utilized, such as isopropanol, mixed amyl alcohols, and the like. Other procedures, including adsorption, may be also used for pigment removal, as illustrated hereinbelow. The desired non-hydrolyzable fraction is about 5 per cent (e.g. 5 g. in 100 ml. of butanol) soluble in these organic solvents, but is over 10 per cent soluble in water and is partially soluble in absolute ethyl alcohol.

Sodium chloride is preferred for salting the desired product from solution. However, the salting-out procedure may be accomplished by the use of ammonium sulfate, magnesium sulfate, soldium sulfate, potassium phosphate, or other equivalent salts, as is well known in the art.

The process is further illustrated by the following examples of practice.

EXAMPLE I

Fresh ox bile is acidified to a pH of 2.0 with CP HCl of 37 per cent concentration (approximately 2 pounds per 40 gallons of bile). Pepsin, obtained commercially and having an activity of about 1:3000, is added periodically during digestion until a total of about 3 grams per gallon of solution is used. Toluene is added to about 5 cm above the aqueous surface. The temperature is maintained between 40° and 50°C. and hydrolysis is continued for a period of three to 5 days with periodic agitation of the mixture. The hydrolyzed material is then filtered under acid conditions at room temperature, utilizing about one pound of diatomaceous earth per 100 pounds of fresh bile to speed up the filtration. The resulting filtrate is concentrated to about two-thirds of its volume at a pH in the range of 2.0 to 3.0 in a glass or Monel vacuum vessel or by means of an ion exchange column at a temperature of about 45° to 50°C. Sodium chloride is added until the concentrated solution is brought up to 20 per cent NaCl saturation. Butanol is added in increments to the salt solution to thereby give a clean-cut, two-phase system. The amount of butanol required is approximately 5 per cent of the total volume. The butanol phase, containing most of the bile pigments, is separated from the aqueous phase. The butanol extraction of the aqueous phase may be repeated to more completely remove the bile pigments. The separated butanol is washed with hydrochloric acidified distilled water to recover any additional water-soluble material from the butanol phase. The combined fractions are concentrated at about 45° to 50°C. under vacuum until the water phase is saturated with NaCl. Concentration of approximately 5 to 1 is required. The saturated NaCl solution is then allowed to stand from 2 to 3 days at 10°C. or less. During this period a white amorphous precipitate forms in the water while any salt that may crystallize sinks to the bottom of the container. The bulk of the amorphous precipitate is separated on cheesecloth or other suitable coarse cloth. The filtrate is then centrifuged, and the precipitated materials are combined. The separation of the precipitate is carried out at 10°C. The filtrate, which comprises a saturated NaCl solution, is checked for additional precipitable material by concentration of a small portion. If no more material precipitates out, the solution is discarded. If further precipitation takes place, the entire solution is further concentrated at 40° to 50°C. under vacuum, and the additional precipitates are dissolved in a minimum of water at room temperature. The resulting solution is then saturated with sodium chloride and allowed to stand overnight at 10°C. Reprecipitated solid matter is collected by centrifuging and is washed with saturated NaCl solution to further remove colored impurities.

The precipitate may, alternatively, be redissolved in distilled water and dialyzed against chilled distilled water for 4 hours to remove any dissolved salt. This procedure may be repeated several times to increase the purity of the product. The solution in the dialysis bags is concentrated by blowing air over the outside of the bags. The final volume should be about 30 per cent of the original or until a precipitate starts to form. The solution is then standardized on a per cent-solids basis and constitutes this product of the process.

The bile product assays about 95 per cent taurocholic acid, but appears to contain a bile acid conjugate that has never been isolated before. It is water soluble, approximately 95 per cent ethanol soluble, but insoluble in the other common organic solvents, such as ether, chloroform and petroleum ether. On hydrolysis with 6N HCl for 18 hours, it can be resolved into an approximately 35 per cent aqueous phase and ethyl ether phase of approximately 65 per cent of original weight. The aqueous phase contains a number of distinct constituents, as determined by paper electrophoresis. The ether phase contains a fatty material giving a positive Pettenkoffer reaction identical qualitatively but not quantitatively with cholic acid.

The following bio-assay is indicative of the carcinolytic property of the bile derivative, since the dye employed will stain only living cells (the succinic dehydrogenase in the cytoplasm). A volume of a 10 per cent suspension of Ehrlich ascites tumor cells in Locke's or phosphate buffer solution at a pH of 7.0 to 7.2 is divided equally in two test tubes. To one tube is added the bile derivative in concentration of mg. per ml. The other serves as a control. The test tubes are incubated in a 37°C. waterbath for 30 minutes. At the end of this period, to each test tube is added 2,3,5-triphenyltetrazolium chloride compound to a final concentration of 1 per cent. The results are read at about the end of 15 minutes. The control changes to pink or deep red. The test tube containing the bile derivative remains practically colorless.

EXAMPLE II

One liter of beef bile is mixed with sufficient 10 per cent HCl to bring about a pH of 3.0 to 3.5. The resulting material is filtered. Pepsin having an activity of at least 1:3000 is then added, as in Example I. To this mixture is then added a quantity of toluene sufficient to form a phase layer above the water level. The object of the toluene is to take up liberated fats and bile pigments. The mixture is then maintained at constant temperature in the range of from 40° to 50°C. for 5 days. Following this period, the hydrolyzed material is transferred to a separatory funnel, the toluene is removed, and the aqueous phase is treated as follows:

The aqueous pepsin hydrolysate is brought to a pH of about 4 to 6 and mixed with a saturated solution of ammonium sulfate $(NH_4)_2SO_4$ to produce about one-third to about one-half saturation with ammonium sulfate. The precipitate formed in the hydrolysate ammonium sulfate mixture is removed by filtration or centrifugation. The resulting precipitate, which is the desired fraction, is dissolved in distilled $H_2O$ and treated as above to remove the bile pigments. Following the removal of the butanol, the aqueous phase is dialyzed in distilled $H_2O$ until sulphate free. The salt-free solution thus produced is then concentrated for convenience to contain preferably about 5 mg. of dissolved material per ml. of solution. The proper amount of sodium chloride is added to produce an isotonic solution.

EXAMPLE III

The bile is first acidified with hydrochloric acid (HCl) to about a pH of 3 to 4 and filtered. The filtrate is brought up to a pH of 7.5 to 8.5 with any standard base, such as potassium hydroxide or sodium hydroxide. To the filtrate is added either trypsin, chymotrypsin or papain, or its derivatives, in the ratio of about 3 gm. of the enzyme to one gallon of the filtrate. The digestion is carried out under toluene for about 3 to 7 days, or longer if desired, at a temperature of about 37° to 45°C. The rest of the procedure follows that described in Examples I or II.

Modified procedures for handling the hydrolysates are given below.

EXAMPLE IV

In another method, the final isolation of the desired component may be obtained as follows: The precipitated amorphous material obtained as described above is dissolved in distilled water and saturated to about 40 per cent to 50 per cent saturation of sodium chloride. This is mixed with a suitable quantity of butanol and transferred to a separatory funnel. Under these conditions, the active material will be forced into the butanol phase. The aqueous phase is treated with several volumes of fresh butanol until upon the evaporation of a small aliquot of butanol, only insignificant quantities of the salt-precipitate material is found. The pigmented butanol is then mixed with an adequate quantity of (about 1 gm. per liter) activated carbon, allowed to stand at room temperature for about four hours with intermittent stirring and then filtered by suction. The carbon is washed with fresh warm butanol to remove residual material from the carbon. The butanol is removed at reduced pressure, and the residue lyophilyzed. The amount of sodium chloride is determined in a small aliquot of dry weight, and the difference constitutes the desired material.

EXAMPLE V

The desired hydrolysate fraction may also be obtained by mixing the hydrolysate with various concentrations of ethyl alcohol (40 to 90 per cent) with corresponding amounts of peroxide-free ethyl ether. The amount of ether required depends upon the concentration of the hydrolysate material in the alcohol solution. A high concentration of the material in the alcohol may require only 25 per cent of ether whereas a weaker concentration may require as high as 50 per cent of the ether, based on the volume of the alcohol solution. Addition of the ether to the alcohol solution causes a precipitation of the dissolved hydrolysate fraction. The precipitated material is separated by centrifugation or filtration, and then is dissolved in distilled water and dialyzed against distilled water until the water is negative to tests for chloride.

Instead of ethyl ether, methyl-iso-butyl carbonol may be employed. The precipitate is then dissolved in water, dialyzed as above and brought to desired concentrations to produce the product solution.

The bile acid-peptide conjugates from the hydrolysate may also be obtained by means of electrophoretic separation as well as by paper electrophoresis.

The fraction may also be separated from the hydrolysate by the determination of the iso-electric point of the material and the precipitate isolated by filtration or centrifugation.

EXAMPLE VI

The bile hydrolysate from either pepsin, trypsin, papain, or any other proteolytic enzyme, is dialyzed against distilled water until chloride free. The material is then concentrated to about one-half or one-third of original volume. The concentrate is then mixed with an adsorbent, such as activated carbon, to a consistency of a thick paste. The material is extracted repeatedly with normal butyl alcohol until an aliquot of the alcohol, upon evaporation, shows little or no residue. The adsorbent is then extracted with distilled water, either neutral or made slightly acidic, until a small aliquot of the extract solution gives a negative Pettenkofer reaction, or its equivalent. The traces of butanol are removed from the aqueous extractive by evaporation. The water is then removed at reduced pressure.

Five ml. or any desired aliquot of the final solution obtained from any method previously described, is evaporated to dryness to determine the amount of the residual material per ml. The solution is then brought up or diluted to any desired concentration, preferably from 5 to 25 mg. per ml. To this solution is added merthiolate as a preservative in concentration of 1 to 10,000 parts of solution, and the resulting mixture is passed through a Seitz filter under aseptic precautions. The final material is then tested for sterility by standard procedures.

The appearance of the final aqueous solution is colorless. It is Molisch negative. It is ninhydrin and Pettenkofer positive. A 20-hour hydrolysis of the dry material dissolved in 6N HCl yields a solid waxy substance soluble in concentrated $H_2SO_4$, and giving characteristic sterol color reactions.

| Batch I | | Batch II | |
|---|---|---|---|
| Carbon | 58.64% by weight | Carbon | 54.77% by weight |
| Hydrogen | 9.08% by weight | Hydrogen | 8.78% by weight |
| Nitrogen | 5.14% by weight | Nitrogen | 6.48% by weight |
| | | Ash | 11.2 % by weight |

The material appears to be one or more polypeptides conjugated with a steroid, such as one or more of the bile acids or related steroid compounds.

Toxicity studies show that a 30 gm. mouse will tolerate between 10 to 13 mg. of the material when injected intraperitoneally. An acute toxicity study was made with an aqueous concentration of 91 mg. ml. of the isolated material.

The solution was administered intraperitoneally to white Swiss mice. The Lethal Dose 50 (deaths being counted at the end of four hours) was found to be 600 mg./kg., and this value can be considered to lie between 450 mg/kg. and 800 mg./kg. with a high degree of certainty.

EXAMPLE VII

A. Conjugation with Human Plasma: Under aseptic precaution, a 10 per cent solution of BBD, obtained as shown in any of the examples above, is triturated with lyophilyzed human plasma in the ratio of 10:1 (1 gm. of BBD to 0.1 of plasma). This is allowed to stand at room temperature for about 1 hour.

B. Reaction with $^{131}I$ ("labeling"): The labeling of BBD with $^{131}I$ is carried out in the following manner. To one millicurie of $^{131}I$ is added 6.25 ml. of 10 N HCl followed by adding 0.15625 ml. of 0.2 M $NaNO_2$. This is then neutralized to pH 8 – 9 with 10 N NaOH, mixed in 100 ml. phosphate buffer normal saline at a pH 8. The mixture is then added slowly and mixed by stirring with the protein, viz., 160 mg. globulin or albumen dissolved in 10 ml. of normal saline. Stirring is continued for about 30–45 minutes. 5 to 10 gms. of BBD in 10 ml. of normal saline is then added, under constant stirring. The mixture is then dialyzed in 4 liters of phosphate buffer normal saline at pH 8 for 8 hours. Two additional changes of the dialysate are then made at 8-hour intervals. The contents in the dialyzing tube is then concentrated near to its original volume and transferred to a sterilized Millipore (0.45 microns) filter. Following filtration, the end product is tested for the specific activity of the protein-bound $^{131}I$, sterility and pyrogenisity.

When the $^{131}I$-bearing complex is administered to a cancerous animal, the complex is preferentially taken up by the tumor, as may be demonstrated by scintillometer scanning.

EXAMPLE VIII

Seven to ten grams of the pyrogen-free bile derivative is added slowly to commercially obtainable $^{131}I$ labeled human serum albumin in solution (10 – 20 Mc.) under constant stirring until a complete solution of the powder is achieved. The mixture is allowed to stand at room temperature for about 30 minutes and filtered through a 0.45 micron Millipore filter. The filtrate is then tested for specific activity and sterility. It is then diluted to a 1 percent solution of the BBD and administered gutatim intravenously.

Although I have herein shown and described my invention by giving certain specific embodiments, it is recognized that departures can be made therefrom within the scope of my invention, which is not to be limited to the details disclosed herein, but is to be accorded the full scope of the claims so as to embrace any and all equivalent means and methods.

Having described my invention, I claim:

1. The method of forming an iodine-131 labelled complex comprising the steps of first preparing a water-soluble fraction from fresh animal bile by acidifying said bile to a pH in a range from about 2.0 to about 3.5 with a strong mineral acid, filtering the acidified bile, adding pepsin to the filtered bile, subjecting the resulting mixture to hydrolysis at a temperature in the range of from about 40°C. to about 50° C. for a time period of from about 1 to about 5 days, filtering the hydrolyzed bile, extracting bile pigments from the filtrate with an aliphatic alcohol having more than two carbon atoms, salting out the dissolved material from the resulting aqueous phase to form an amorphous precipitate, recovering said precipitate, and redissolving said precipitate in distilled water;

and subsequently forming an aqueous solution of said water-soluble fraction and of a blood-derived protein chosen from the class consisting of plasma, albumin, globulin, and mixtures thereof;

permitting said aqueous solution to stand at about room temperature until an intermediate complex has formed between said water-soluble fraction and said blood-derived protein;

admixing to said intermediate complex a preselected amount of iodine-131 so as to form a labelled complex.

2. The method of claim 1 in which said mineral acid is hydrochloric acid, and said aliphatic alcohol is butanol.

3. The labeled complex produced in accordance with the method of claim 1.

* * * * *